(12) United States Patent
Yuan et al.

(10) Patent No.: US 6,317,189 B1
(45) Date of Patent: Nov. 13, 2001

(54) HIGH-EFFICIENCY REFLECTIVE LIQUID CRYSTAL DISPLAY

(75) Inventors: Haiji Yuan, Cupertino; Thomas G. Fiske, Campbell, both of CA (US); Louis D. Silverstein, Scottsdale, AZ (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/221,599

(22) Filed: Dec. 29, 1998

(51) Int. Cl.[7] .................. C09K 19/02; G02F 1/1335; G02F 1/1347

(52) U.S. Cl. .................. 349/176; 345/115; 345/113; 349/78; 349/80

(58) Field of Search ................. 349/176, 175, 349/115, 113, 86, 88, 74, 78, 80

(56) References Cited

U.S. PATENT DOCUMENTS

| | | | |
|---|---|---|---|
| 4,596,445 | 6/1986 | Fergason | 350/339 |
| 4,952,033 | 8/1990 | Davis | 350/351 |
| 5,193,015 | 3/1993 | Shanks | 359/53 |
| 5,200,845 * | 4/1993 | Crooker et al. | 359/51 |
| 5,539,848 | 7/1996 | Yamazaki et al. | 359/53 |
| 5,570,216 * | 10/1996 | Lu et al. | 359/101 |
| 5,729,320 | 3/1998 | Eidenschink et al. | 349/166 |
| 5,731,861 * | 3/1998 | Hatano et al. | 349/169 |
| 5,751,452 | 5/1998 | Tanaka et al. | 359/52 |
| 5,769,454 * | 8/1998 | Ma | 349/98 |
| 5,796,454 * | 8/1998 | Ma | 349/98 |
| 5,875,012 * | 2/1999 | Crawford et al. | 349/74 |
| 5,929,956 * | 7/1999 | Neijzen et al. | 349/113 |
| 5,986,729 * | 11/1999 | Yamanaka et al. | 349/79 |
| 6,015,507 * | 6/2000 | Kobayashi et al. | 252/299.01 |
| 6,133,971 * | 10/2000 | Silverstein et al. | 349/86 |

OTHER PUBLICATIONS

"Novel LCD Projection Based on Cholesteric Filters" Schadt et al 1995.*

"Multicolor Reflective Cholesteric Displays" Chien et al 1995.*

"Cholesteric polarisers: simulated performance in PLLCDs" Springle et al 1998.*

Tanaka, K. et al., "18.1: Optimization of Holographic PDLC for Reflective Color Display Applications," SID 95 Digest, pp. 267–270.

Tanaka, K. et al., "A Liquid–Crystal/Polymer Optical Device Formed by Holography for Reflective Color Display Applications," NTT, Interdisciplinary Research Laboratories, pp. 109–111.

Date, M. et al., "S24–2: Three–Primary–Color Holographic Polymer Dispersed Liquid Crystal (HPDLC) Devices For Reflective Displays," Asia Display 95, pp. 603–606.

(List continued on next page.)

Primary Examiner—Kenneth Parker
Assistant Examiner—Mike Qi
(74) Attorney, Agent, or Firm—Oliff & Berridge, PLC (57) ABSTRACT

A reflective display comprises a pair of substrates and a holographic polymer dispersed cholesteric liquid crystal (HPDCLC) material formed between the substrates. The holographic polymer dispersed cholesteric liquid crystal material comprises a holographic polymer dispersed liquid crystal material and a cholesteric liquid crystal material. These two materials reflect one or more different intrinsic colors such that individual cells of the display can reflect one or more different intrinsic colors. The cells can comprise more than two layers, with each layer being reflective of a different intrinsic color. The cells in such embodiments can reflect three different intrinsic peak wavelengths and one or more intrinsic colors, enabling the display to reflect all colors.

26 Claims, 8 Drawing Sheets

OTHER PUBLICATIONS

Kreuzer, M. et al., "New Liquid Crystal Display with Bistability and Selective Erasure Using Scattering in Filled Nematics," Appl. Phys. Lett. 62 (15), 1993, pp. 1712–1714.

Crawford, G.P. et al., "Reflective Color LCDs Based on H–PDLC and PSCT Technologies," 4 pp.

Crawford, Gregory P. et al., "Reflective Color Display for Imaging Applications," IS&T/SID 1995 Color Imaging Conference: Color Science, Systems and Applications, pp. 52–58.

Tanaka, Keiji et al., "Holographically Formed Liquid–Crystal/Polymer Device for Reflective Color Display," Journal of the SID Feb. 1, 1994, pp. 37–40.

Crawford, G.P. et al. Ed., "Liquid Crystals in Complex Geometries: Formed by Polymer and Porous Networks," Taylor & Francis, 1996, pp. 103–142, 255–264, 265–280, and 307–324.

* cited by examiner

HIGH-EFFICIENCY REFLECTIVE LIQUID CRYSTAL DISPLAY

BACKGROUND OF THE INVENTION

1. Field of Invention

This invention relates to the field of liquid crystal displays. More particularly this invention is directed to multi-color reflective liquid crystal displays that reflect multiple colors from individual cells.

2. Description of Related Art

Current reflective liquid crystal displays (LCDs) can provide reduced power consumption, lighter weight, thinner packages, and better adaptability to a wider range of ambient conditions (e.g., in-doors and out-doors) than transmissive or emissive flat panel displays (FPDs) can. These features make reflective LCDs suitable for many applications where portability and/or viewability under high ambient illumination are desired. Personal document readers (PDR), personal information tools (PIT), and hand-held maps and manuals are exemplary applications for these reflective LCDs.

The reflective nature of reflective LCDs can reduce power consumption by one-half by eliminating backlight requirements. Further reduction in power consumption in reflective LCDs can be achieved in polymer-stabilized cholesteric texture (PSCT) liquid crystal displays. These polymer-stabilized cholesteric texture liquid crystal displays comprise a cholesteric liquid crystal medium which contains a stabilizing polymer network.

Figure 1A:
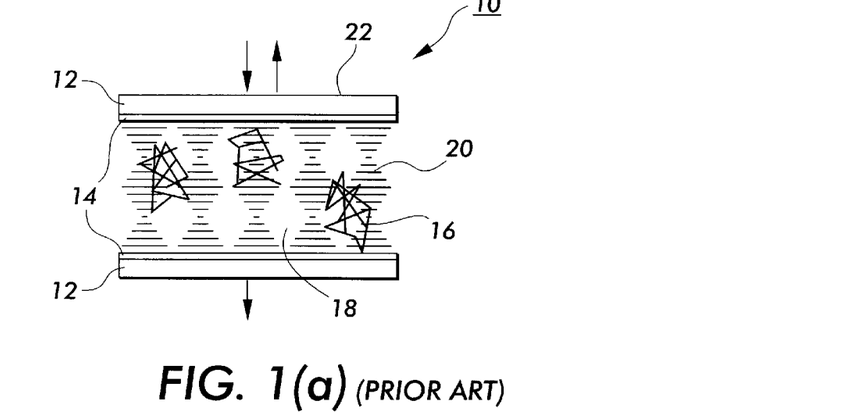
FIG. 1(a) illustrates a known polymer stabilized cholesteric textured (PSCT) liquid crystal reflective display in the field-off state, in which the liquid crystal material has a planar texture.
Figure 1B:
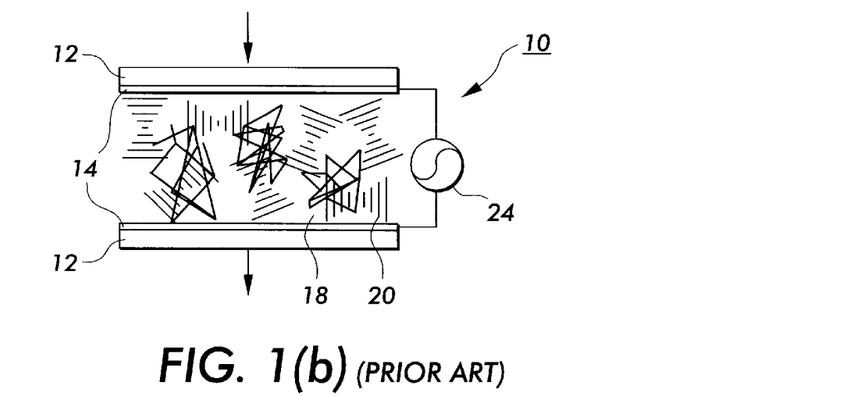
FIG. 1(b) illustrates the polymer-stabilized cholesteric texture liquid crystal display of FIG. 1(a) in an intermediate applied voltage state, in which the liquid crystal material has a focal conic texture.
Figure 1C:
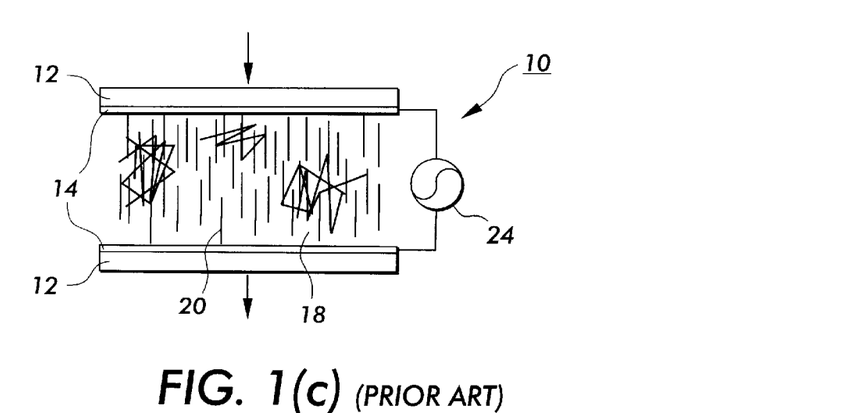
FIG. 1(c) illustrates the polymer-stabilized cholesteric texture liquid crystal display of FIG. 1(a) in a high applied voltage state.

FIGS. 1(a)–1(c) illustrate the operation of such a polymer-stabilized cholesteric texture liquid crystal display 10, as described in "Reflective Color Displays for Imaging Applications," by G. P. Crawford et al., Proceedings of the IS & T/SID 1995 Color Imaging Conference: Color Science, Systems and Applications, pp. 52–58, incorporated herein by reference in its entirety. The display 10 comprises a pair of transparent substrates 12, a pair of transparent electrodes 14, and a polymer stabilized cholesteric liquid crystal medium 16 located between the electrodes 14. A polymer network 18 stabilizes the liquid crystal material 20.

As shown in FIG. 1(a), in the voltage off-state, the planar texture is stable and the helical axes of the cholesteric liquid crystal material 20 are substantially perpendicular to the surface 22 of the substrate 12 on which natural or artificial light impinges. The planar texture selectively reflects incident light centered at the Bragg wavelength, $\lambda_B = nP$, where n is the average index of refraction of the liquid crystal material 20 and P is the pitch length of the helical structure of the liquid crystal material 20. The pitch P can be selectively varied by adding chiral agents to the liquid crystal material 20. The chiral agents affect the pitch of the cholesteric liquid crystal material 20, and thus also the Bragg wavelength $\lambda_B$.

As shown in FIG. 1(b), when a low voltage is applied between the electrodes 14 by a voltage source 24, the planar texture of the cholesteric liquid crystal material 20 is transformed into a focal conic texture, in which the helical axes of the liquid crystal are randomly aligned. In this state, the cell is substantially light transparent. If the applied voltage is then removed, the focal conic texture remains fixed due to the stabilizing effect of the polymer network 18. As shown in FIG. 1(c), if a greater field is applied to the display, the cholesteric liquid crystal material 20 becomes completely aligned and completely transparent.

The response of the polymer cholesteric stabilized liquid crystal material 16 to the release of the applied field is dependent on the rate of release of this field. Quickly releasing this field causes the cholesteric liquid crystal material 20 to relax back to the planar texture shown in FIG. 1(a). If the field is released more slowly, then the cholesteric liquid crystal material 20 will relax back to the focal conic texture shown in FIG. 1(b). This bistable memory capability of polymer-stabilized cholesteric texture LCDs can significantly reduce the power consumption of the displays in many applications, because the displays consume no power when viewed and only need to be powered for short periods of time to change the displayed image.

Figures 2A, 2B:
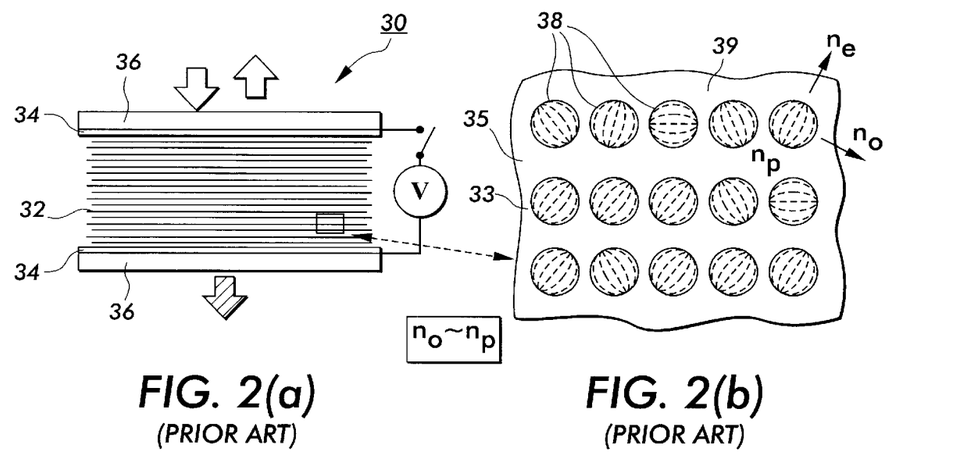
FIG. 2(a) illustrates a known holographically structured polymer-dispersed liquid crystal (H-PDLC) reflective display in the field-off state.
FIG. 2(b) is an enlarged view of a portion of the holographically structured polymer dispersed liquid crystal material of the display of FIG. 2(a), showing the orientation of the liquid crystal droplets in the field-off state.

FIGS. 2(a)–2(d) show another type of known reflective color display device, a holographically structured polymer dispersed liquid crystal (HPDLC) display 30. These displays are also described in the incorporated Crawford reference. Holographically structured polymer dispersed liquid crystal displays are formed using optical interference techniques applied to a mixture of liquid crystal material and photo-curable polymer material. This technique forms fringe planes 33 of liquid-crystal-filled droplets at predetermined positions within a polymer matrix separated by a plurality of polymer-rich planes, 35. As a result, the liquid crystal droplet densities are spatially modulated in the direction perpendicular to the planar structure. As shown in FIG. 2(a), a holographically structured polymer dispersed liquid crystal material 32 is sandwiched between a pair of transparent electrodes 34 and a pair of transparent substrates 36. In particular, in each liquid-crystal-rich plane 33, a plurality of liquid crystal droplets 38 are dispersed in a network of the polymer 39. In contrast, in the polymer-rich planes 35, there is essentially only the network of the polymer 39. In the field-off state shown in FIGS. 2(a) and 2(b), the liquid crystal molecules in the liquid crystal droplets 38 dispersed in the polymer 39 are randomly oriented, or misaligned, within the liquid crystal droplets 38. The effective refractive index of the droplets 38 is therefore significantly higher than the index of refraction, $n_p$, of the polymer matrix 39. The directions of the extraordinary index of refraction, $n_e$, and the ordinary index of refraction, $n_o$, of the liquid crystal droplets 38 are shown. Consequently, the holographically structured polymer dispersed liquid crystal display 30 reflects light at the Bragg wavelength $\lambda_B$. The reflectance under ambient illumination conditions for these holographically structured polymer dispersed liquid crystal displays 30 is larger than that for the polymer-stabilized cholesteric texture display 10 shown in FIGS. 1(a)–1(c).

Figure 2C:
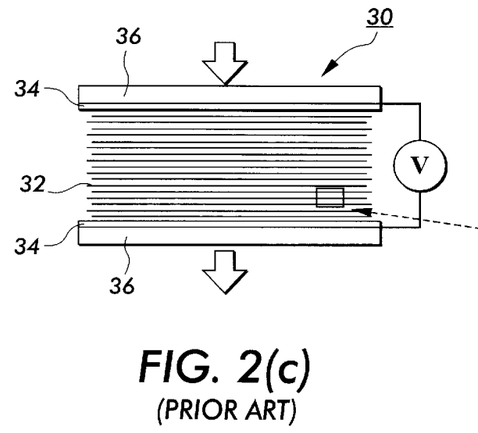
FIG. 2(c) shows the holographically structured polymer dispersed liquid crystal reflective display of FIG. 2(a) in the field-on state.
Figure 2D:
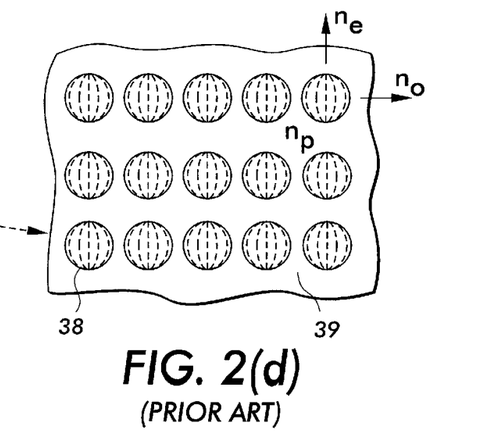
FIG. 2(d) is an enlarged view of a portion of the holographically structured polymer dispersed liquid crystal material of the display of FIG. 2(c), showing the orientation of the liquid crystal droplets in the field-on state.

When voltage is applied across the liquid crystal display 30, as shown in FIGS. 2(c) and 2(d), the liquid crystal molecules align within the liquid crystal droplets 38, as shown in FIG. 2(d). As a result, the index of refraction of the liquid crystal droplets 38 approximately equals the index of refraction of the polymer matrix 39 along the direction of light propagation. As shown, $n_e$ is parallel to the incident and reflected light direction, and $n_o$ is perpendicular to the incident and reflected light direction. The periodic refractive index modulation vanishes if $n_o$ of the liquid crystal material in the liquid crystal droplets 38 approximately equals the index of reflaction $n_p$ of the polymer matrix 39. In this state, the holographically structured polymer dispersed liquid crystal display 30 is essentially light transparent and does not reflect or diffract the light incident on the holographically structured polymer dispersed liquid crystal display 30.

The effective refractive index of the liquid crystal droplets 38 can be varied with applied voltage, enabling the reflected light intensity to be controlled electrically.

In addition, the spectral reflectance of the holographically structured polymer dispersed liquid crystal display 30 can be selectively controlled by fabrication. To date, such holographically structured polymer dispersed liquid crystal displays 30 represent an especially promising reflective technology because of their high peak reflectance capability.

Holographically structured polymer dispersed liquid crystal reflective displays are described in detail in U.S. Pat. No. 6,133,971, incorporated herein by reference in its entirety.

SUMMARY OF THE INVENTION

One of the major challenges for high-performance, reflective color LCDs is to achieve high spectral reflectance while providing a high level of color selectivity and reflected luminance. Reflective color displays need to provide good color selectivity while efficiently using available ambient illumination in various lighting conditions.

Transmissive active-matrix color LCDs include linear polarizers, absorptive color filters and spatially patterned color filter mosaics to synthesize color. These elements significantly affect light transmission by the associated devices in which they are used. For example, two high-efficiency polarizers used in transmissive twisted-nematic (TN) LCDs transmit only about 40% of the light across the visible spectrum. This limits the reflectance of the display to an absolute maximum of about 40% before any other light losses occur within the display. Such other light intensity losses include, for example, spectral filtering. Color filter absorption and the apertures of thin film transistor (TFT) driver array substrates further reduce the display efficiency. The best color TFT-LCDs today offer less than 10% transmission, and can not offer the high reflectivity needed for a good color reflective display.

The above-described polymer stabilized cholesteric texture (PSCT) liquid crystal displays can reflect up to 50% at the Bragg wavelength.

Higher Bragg reflection can be achieved in the above-described holographically structured polymer dispersed liquid crystal (HPDLC) displays. Holographically structured polymer dispersed liquid crystal displays can ideally reflect 100% at the Bragg wavelength. These devices do not, however, provide the above-described memory effect that can significantly reduce display power consumption.

This invention provides a display that combines the benefits of holographically structured polymer dispersed liquid crystal displays and polymer-stabilized cholesteric texture displays in a singe device.

This invention separately provides a holographically-formed display that has a low-power operation mode.

This invention separately provides a holographically-formed display that has a memory effect.

This invention separately provides a polymer-stabilized cholesteric texture display that has an improved reflectivity.

This invention separately provides a combined polymer-stabilized cholesteric texture and holographically structured polymer dispersed liquid crystal display.

This invention separately provides a method for forming a polymer-stabilized cholesteric texture display having a holographic structure.

One of the major challenges for high performance reflective displays is to achieve high reflectivity. The holographic polymer dispersed cholesteric texture display provided by this invention can reflect two or more different intrinsic peak wavelengths, which can be for one or more intrinsic colors, from a single cholesteric liquid crystal/polymer layer. The intrinsic colors can be, for example, red, green or blue. Each of these intrinsic colors can have multiple intrinsic peak wavelengths within certain wavelength ranges.

In addition, the holographic polymer dispersed cholesteric texture display provided by this invention has a memory effect and has reduced power consumption.

A first reflected intrinsic peak wavelength is obtained in the holographic polymer dispersed cholesteric texture display from a cholesteric liquid crystal material. This first intrinsic peak wavelength can be selected by the addition of suitable chiral agents into a nematic liquid crystal material to form the cholesteric liquid crystal mixture.

A second reflected intrinsic peak wavelength is obtained in the display by a holographically formed, periodically-alternating, layered structure of polymer-rich layers and liquid-crystal-rich layers. The liquid-crystal-rich layer can comprise a cholesteric liquid crystal material. This second intrinsic peak wavelength can be selected by the wavelength and/or incident angles of interfering laser beams used to photocure the polymer component of the holographic polymer dispersed cholesteric texture display.

The two intrinsic peak wavelengths can be selectively mixed to provide a multi-color reflective display. The display can also include a selectively colored background to contrast or complement the multiple reflective colors.

In other embodiments of this invention, the holographic polymer dispersed cholesteric texture display can comprise more than two layers that each reflect a different intrinsic peak wavelength, enabling the displays to reflect more than two intrinsic peak wavelengths from one cell. Exemplary holographic polymer dispersed cholesteric texture displays can comprise two holographically structured polymer dispersed liquid crystal layers that each reflect a different intrinsic peak wavelength, and a cholesteric liquid crystal layer that reflects a third intrinsic peak wavelength. The individual layers in such holographic polymer dispersed cholesteric texture displays can be selectively, individually powered such that the displays can selectively reflect either one, two or three intrinsic peak wavelengths (and one or more intrinsic colors) simultaneously.

These and other features and advantages of this invention are described in, or are apparent from, the following detailed description of the structures, devices and methods according to this invention.

BRIEF DESCRIPTION OF THE DRAWINGS

Various embodiments of this invention will be described in detail, with reference to the following figures, wherein.

DETAILED DESCRIPTION OF PREFERRED EMBODIMENTS

This invention provides reflective holographic polymer dispersed cholesteric liquid crystal (HPDCLC) displays. The displays can be either active-matrix or passive-matrix addressed reflective displays. The HPDCLC displays can provide multiple intrinsic reflective peak wavelengths or colors, a memory effect and high reflection efficiencies.

FIGS. 3(a)–3(f) illustrate an exemplary holographic polymer dispersed cholesteric texture liquid crystal (HPDCLC) display 40 according to this invention. As shown, the display 40 comprises a pair of opposed transparent substrates 42, a pair of transparent electrodes 44, and a light reflective medium. As shown in FIGS. 3(a)–3(f), the light reflective medium is a holographic polymer dispersed cholesteric liquid crystal material 46. The electrodes 44 and holographic polymer dispersed cholesteric liquid crystal material 46 form a sandwich structure. A voltage source 47 is electrically connected to the electrodes 44 to selectively apply an electric field E to the holographic polymer dispersed cholesteric liquid crystal material 46 to alter the reflective characteristics of the holographic polymer dispersed cholesteric liquid crystal display 40, as described in detail below.

Figure 3A:
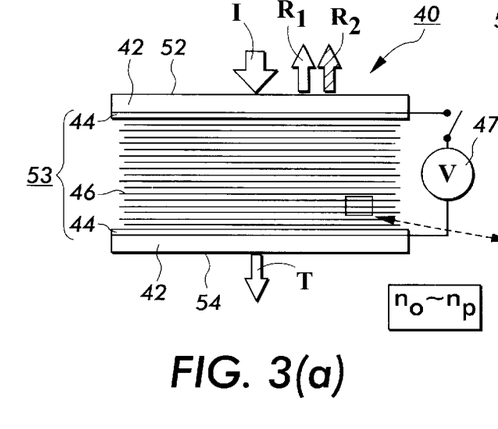
FIG. 3(a) illustrates one exemplary embodiment of a holographic polymer dispersed cholesteric texture liquid crystal (HPDCLC) reflective display according to this invention in the field-off state, in which the liquid crystal material has a planar texture.

The substrates 42 can be formed by any suitable light transparent material, such as glass. The electrodes 44 are typically formed by glass plates coated with a suitable transparent and conductive material, such as indium tin oxide (ITO). The electrodes can optionally be formed using any other suitable materials.

The holographic polymer dispersed cholesteric liquid-crystal material 46 comprises a holographic layered structure of alternating polymer-rich regions or layers 48, and liquid-crystal-rich regions or layers 50. As described below, the holographic structure is formed by irradiating a mixture of cholesteric liquid crystal and photopolymerizable materials with light emitted by interfering laser beams. The interfering laser beams impinge on the substrates 42 to set up interference fringes in the holographic polymer dispersed cholesteric liquid crystal material 46.

Holographic polymer dispersed liquid crystal (HPDLC) layers can be prepared using a mixture of a liquid crystal material, a monomer, an initiator system and co-initiators. An exemplary mixture can comprise about 30–40 wt. % of liquid crystal material such as BL038, manufactured by Merck and available from EM Industries, Inc. of Hawthorne, N.Y.; about 40–60 wt. % of a monomer such as DPHPA (dipentaerythrol hydroxy penta acrylate); an initiator system comprising a dye such as about 0.2–0.5 wt. % of RB (Rose Bengal dye); about 1 –10% of a polymerizable solvent for the dye and co-initiator, such as NVP (N-vinylpyrrollidone); about 1–15 wt. % of a co-initiator such as NPG (N-phenylglycine). The monomer DPHPA, the initiator system, NVP and NPG are available from Sigma-Aldrich of St. Louis, Mo.; and other co-initiators such as Darocur 1173, available from Ciba-Geigy Corp. of Hawthorne, N.Y.

In addition, a surfactant can optionally be added to the mixture to reduce the surface energy at the liquid crystal/polymer interface. Reducing this surface energy reduces the switching voltage of the display. A suitable surfactant for this purpose is about 1–10% of S270 surfactant, available from Chem Service, Inc. of West Chester, Pa.

The above-described exemplary mixture, and other suitable mixtures, can be placed between substrates such as ITO-coated glass plates, either by infusion into a pre-assembled cell or by vacuum-bagging the mixture between the ITO-coated glass plates using spacers such as spacer balls or rods (available from EM Industries, Inc., Hawthorne, N.Y.) to achieve a constant cell gap.

A first intrinsic peak wavelength, that corresponds to a Bragg wavelength $\lambda_{BH}$, is generated in the holographic polymer dispersed cholesteric liquid crystal material 46 by photocuring the monomer in the mixture to form a periodically alternating, layered structure of polymer-rich layers, or polymer layers, 48 and cholesteric liquid-crystal-rich layers, or cholesteric liquid crystal layers, 50. This first intrinsic peak wavelength can be tailored by selecting the wavelengths and/or incident angles of two interfering laser beams that are used to photocure the monomer and produce the holographic layered structure, as is well known in the art. For example, the polymer-filled cell can be illuminated by expanded beams from an Argon-ion laser operating at a wavelength of about 514.5 nm and irradiating the sample at a specific angle to produce an effective interference pattern at about 580 nm. Argon-ion lasers are available from Coherent Laser Group, Santa Clara, Calif. The general geometry of the exposure system can be controlled to achieve the desired reflected color of the holographic structure. Exemplary methods of forming holographic polymer dispersed liquid crystal displays are disclosed in U.S. patent application Ser. Nos. 09/141,969 and 09/140,479 both filed on Aug. 28, 1998, and both incorporated herein by reference in their entirety.

Cholesteric liquid crystal materials that provide the second intrinsic peak wavelength of the holographic polymer dispersed cholesteric liquid crystal display 40 can be prepared using nematic liquid crystals doped with chiral agents. The desired pitch of the cholesteric liquid crystal material is achieved by these chiral agents. The pitch length determines the Bragg wavelength $\lambda_{BC}$ at which light is reflected by the cholesteric liquid crystal component. The Bragg wavelength $\lambda_{BC}$, $$\lambda_{BC} = nP,$$

where:
$\lambda_{BC}$ is the Bragg wavelength of the cholesteric liquid crystal material;
n is the average index of refraction; and
P is the pitch length.

Accordingly, changes in the pitch length P affect the Bragg wavelength $\lambda_{BC}$ and, thus, the second intrinsic peak wavelength of reflected light from the cholesteric liquid crystal.

The second intrinsic peak wavelength can be tuned by adjusting the composition and concentration of the chiral agent(s) mixed into the nematic liquid crystal used to form the cholesteric liquid crystal mixture. Exemplary nematic liquid crystals that can be used in this invention include BL037, BL038 and BL087. Exemplary chiral agents that can be used in this invention include ZLI-811, CB-15, ZLI-4571 and MLC-6247. These nematic liquid crystals and chiral agents are available from EM Industries, Inc. of Hawthorne, N.Y. Cholesteric liquid crystals can be also be purchased directly. For example, BL088 in green color, BL090 in blue color, and BL094 in yellow-green color, are available from EM Industries, Inc.

The mixing between the first intrinsic peak wavelength reflected by the holographic structure and the second intrinsic peak wavelength reflected by the cholesteric liquid crystal material at the two different selected Bragg wavelengths $\lambda_{BH}$ and $\lambda_{BC}$ enables the generation of multiple colors from a single cell 53. An additional color can be displayed by a selected background color of the holographic polymer dispersed cholesteric liquid crystal display 40. The background color can be placed at the viewer-distant side 54 of the cell 53 to contrast, or alternatively enhance, the two reflected colors. The background color can be any selected color. The background can also be black, so that a black background appears in the transmissive state of the holographic polymer dispersed cholesteric liquid crystal display 40, as described below.

Figure 3B:
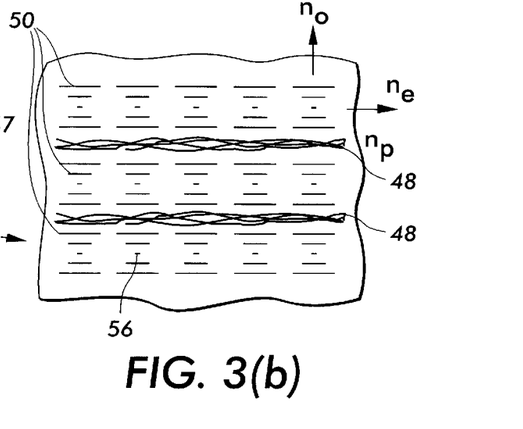
FIG. 3(b) is an enlarged view of a portion of the holographic polymer dispersed cholesteric texture liquid crystal material of the display of FIG. 3(a), showing the orientation of the liquid crystal material in the field-off state.

FIGS. 3(a)–3(f) illustrate the configuration (texture) of the cholesteric liquid crystal in the cholesteric liquid crystal layers 50 in different operative states of the holographic polymer dispersed cholesteric liquid crystal display 40. FIGS. 3(a) and 3(b) show the holographic polymer dispersed cholesteric liquid crystal display 40 in the off-state in which no voltage is applied to the electrodes 44. In the off-state, the cholesteric liquid crystal material 56 in the cholesteric liquid crystal layers 50 is arranged in a planar texture such that helical axes are substantially perpedicular to the surface 52 on which light impinges. The direction of the extraordinary index of refraction, $n_e$, is shown extending in the direction perpendicular to the helical axes of the cholesteric liquid crystal material, which is parallel to the surface 52. The ordinary index of refraction, $n_o$, is approximately equal to the index of refraction, $n_p$, of the polymer. This is a stable configuration of the cholesteric liquid crystal.

In the off-state, incident light I that impinges on the surface 52, at a direction that is substantially parallel to the direction of $n_o$ and substantially perpendicular to the direction of $n_e$, is partially reflected from the substrate 42, and also partially transmitted through the display, as represented by arrow T. The arrows $R_1$ and $R_2$ represent light of two different intrinsic wavelengths (of at least one intrinsic color) reflected by the holographic structure formed by the spatially modulated polymers and cholesteric liquid crystal layers 48 and 50, and from the cholesteric liquid crystal layers 50, respectively. For example, $R_1$ could represent yellow light and $R_2$ could represent blue light. $R_1$ and $R_2$ could also represent, for example, light of two different intrinsic peak wavelengths for the same intrinsic color, such as red, green or blue. The two reflected intrinsic peak wavelengths correspond to the Bragg wavelengths $\lambda_{BH}$ and $\lambda_{BC}$ of the holographic structure and from the cholesteric liquid crystal layers 50, respectively.

Figure 4:
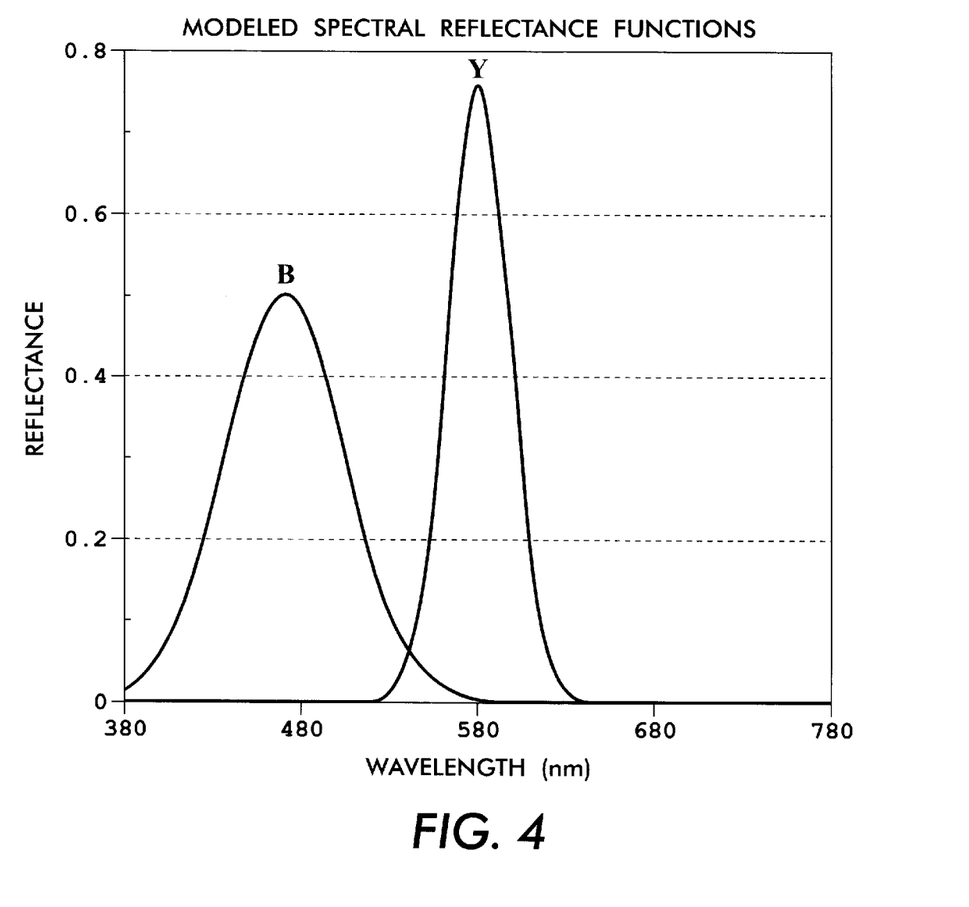
FIG. 4 is a plot of the reflectance versus wavelength of the holographic polymer dispersed cholesteric texture liquid crystal reflective display illustrated in FIGS. 3(a)–3(c), with the cholesteric liquid crystal material tuned for blue reflection and the holographic layers tuned for yellow reflection.

FIG. 4 shows the reflectance versus wavelength when the cholesteric liquid crystal is tuned for blue reflection and the holographic structure is tuned for yellow reflection. The illustrated yellow peak is at about 580 nm and the blue peak is at about 460 nm. The bandwidth of the blue peak is wider than that of the yellow peak and is adjusted to have a peak reflectance appropriate to produce a desired white when combined with the yellow reflection.

Figure 5:
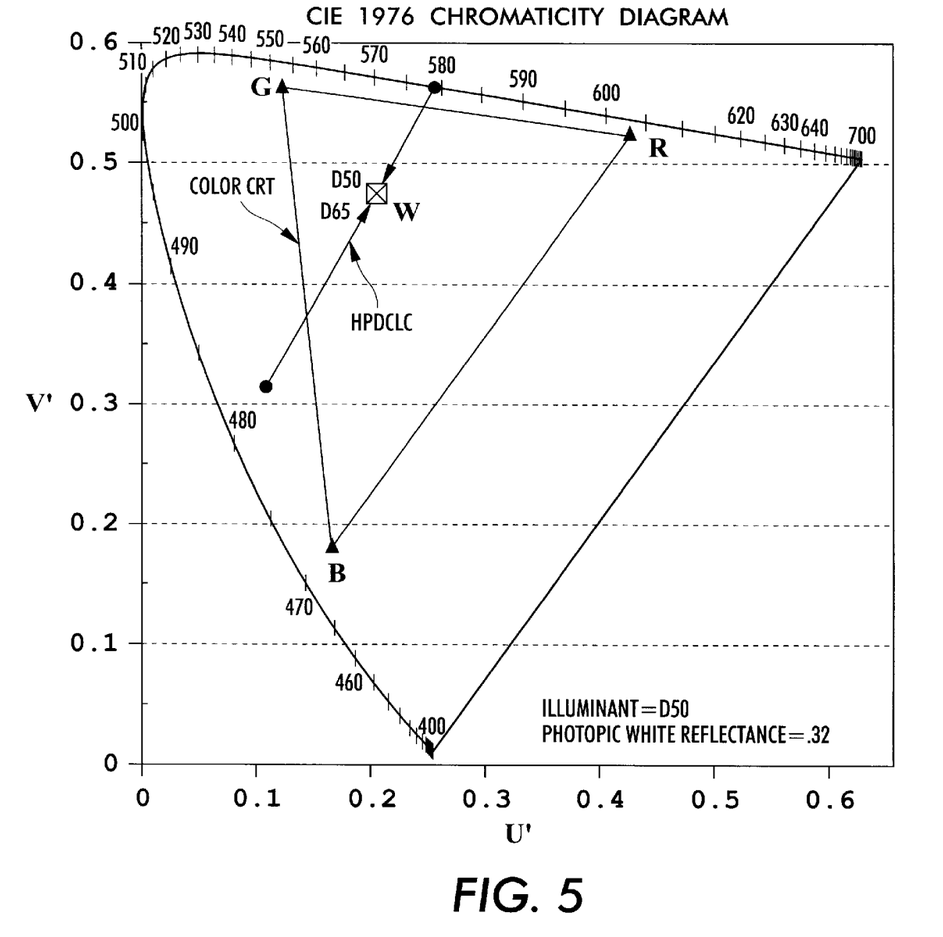
FIG. 5 is a chromaticity diagram showing the color coordinates for the exemplary embodiment of the holographic polymer dispersed cholesteric texture liquid crystal reflective display of this invention shown in FIGS. 3(a)–3(e), with the cholesteric liquid crystal material tuned for blue reflection and the holographic layers tuned for yellow reflection.

FIG. 5 is a chromaticity diagram that shows the corresponding color coordinate for the holographic polymer dispersed cholesteric liquid crystal display 40 tuned for blue and yellow reflection.

It will be understood by those skilled in the art that the spectral reflectance of the cholesteric liquid crystal and the holographic structure can each be selectively tuned with regard to the peak height, location and bandwidth. As explained, for the cholesteric liquid crystal, the chiral agents can be selectively added to affect the pitch length of the helical structure, and thus the intrinsic peak wavelength and color reflected by the cholesteric liquid crystal. The reflected light intensity can be affected by the applied voltage.

As disclosed in U.S. Pat. No. 5,875,012, incorporated herein by reference in its entirety, the holographic structure can be formed to include groups of alternating liquid crystal and polymer layers, with each group of layers being reflective of a different intrinsic peak wavelength of light. This holographic structure can reflect multiple closely spaced intrinsic peak wavelengths of a selected color as represented by separate reflectance peaks, each having a separate bandwidth.

Figure 3C:
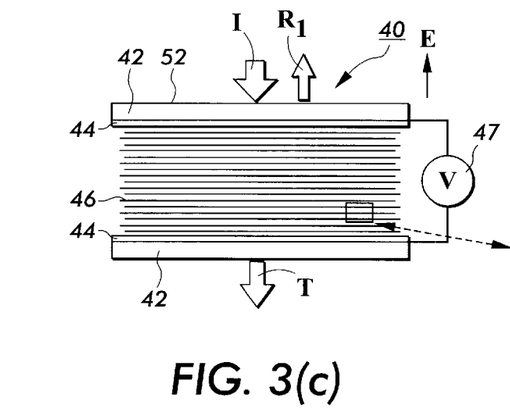
FIG. 3(c) illustrates the holographic polymer dispersed cholesteric texture liquid crystal reflective display of FIG. 3(a) in an intermediate applied voltage state, in which the liquid crystal material has a focal conic texture.
Figure 3D:
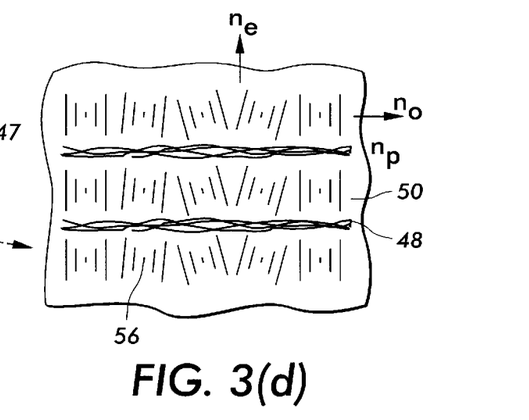
FIG. 3(d) is an enlarged view of a portion of the holographic polymer dispersed cholesteric texture liquid crystal material of the display of FIG. 3(c), showing the orientation of the liquid crystal material in the intermediate applied voltage state.

FIGS. 3(c) and 3(d) show the holographic polymer dispersed cholesteric liquid crystal display 40 when an intermediate level of voltage is applied across the electrodes 44. As shown in FIG. 3(d), the cholesteric liquid crystal material in the cholesteric liquid crystal layers 50 is rotated and transformed into a focal conic texture, in which the helical axes of the cholesteric liquid crystal are partially aligned substantially perpendicular to the applied field E. As shown, both the ordinary index of refraction $n_o$ and the extraordinary index of refraction $n_e$ of the cholesteric liquid crystal layers are on average aligned at intermediate angles between the substrates and the direction of the applied E field. In this state, the holographic structure reflects light of the corresponding Bragg wavelength $\lambda_{BH}$, while the cholesteric liquid crystal layers 50 transmit substantially all light. The holographic polymer dispersed cholesteric liquid crystal display 40 may exhibit some level of haziness in this focal conic state.

Figure 3E:
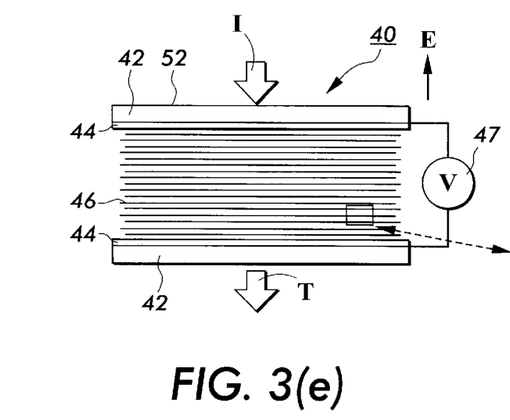
FIG. 3(e) illustrates the holographic polymer dispersed cholesteric texture liquid crystal reflective display of FIG. 3(a) in a high applied voltage state, in which the liquid crystal material has a homeotropic texture.
Figure 3F:
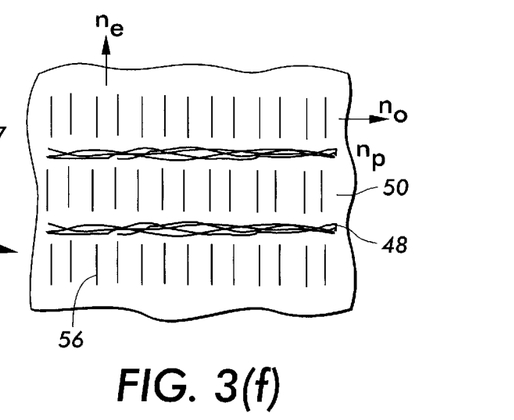
FIG. 3(f) is an enlarged view of a portion of the holographic polymer dispersed cholesteric texture liquid crystal material of the display of FIG. 3(e), showing the orientation of the liquid crystal material in the high applied voltage state.

FIGS. 3(e) and 3(f) show the holographic polymer dispersed cholesteric liquid crystal display 40 when a voltage higher than the intermediate voltage is applied across the electrodes 44. As shown in FIG. 3(f), the cholesteric liquid crystal material in the cholesteric liquid crystal layers 50 is transformed into the homeotropic state, in which the helical axes of the cholesteric liquid crystal are substantially parallel to the substrates while the liquid crystal molecules themselves are parallel to each other and to the direction of the applied E field. The molecule directors of the cholesteric liquid crystal have about the same length and the molecules are substantially untwisted in this state. The ordinary index of refraction $n_o$ of the cholesteric liquid crystal is substantially perpendicular to the applied E field. In this state, the cell is substantially transparent to the incident light. The holographic polymer dispersed cholesteric liquid crystal display 40 is typically the color of the display background.

If the high applied voltage is then removed from the holographic polymer dispersed cholesteric liquid crystal display 40, the homeotropic texture relaxes to one of the focal conic texture shown in FIG. 3(d), or the planar texture shown in FIG. 3(b), depending on the rate of decrease of the voltage. Particularly, if the voltage is quickly released, then the homeotropic texture relaxes to the planar texture of FIG. 3(b), and cells of the holographic polymer dispersed cholesteric liquid crystal display 40 reflect light of both intrinsic peak wavelengths. If the voltage is more slowly released, however, the homeotropic texture relaxes to the focal conic texture of FIG. 3(d), and cells of the holographic polymer dispersed cholesteric liquid crystal display 40 reflect light of one intrinsic peak wavelength. In particular, the intrinsic peak wavelength of the reflected light is the intrinsic peak wavelength reflected by the holographic structure. The polymer-rich layers 48 function as a stabilizing force for the focal conic texture of the cholesteric mixture, and offer multi-stability between the planar and focal conic states.

This bistable memory capability of the holographic polymer dispersed cholesteric liquid crystal display 40 can further reduce the power consumption by an order of magnitude in many applications, because the display consumes no power when viewed and only needs to be powered for short periods of time to change the displayed image.

FIGS. 6(a)–6(f) show a second embodiment of a cell 61 of a holographic polymer dispersed cholesteric liquid crystal display 60 according to this invention. The holographic polymer dispersed cholesteric liquid crystal display 60 comprises a pair of substrates 62; a pair of electrodes 64; a light reflective medium, which in the holographic polymer dispersed cholesteric liquid crystal display 60 is a holographic polymer dispersed cholesteric liquid crystal material 66; and a voltage source 68 to selectively apply voltage to the electrodes 62. In this display, the cholesteric liquid crystal is confined in droplets in the cholesteric liquid crystal layers 70 which alternate with the polymer layers 71.

Figure 6A:
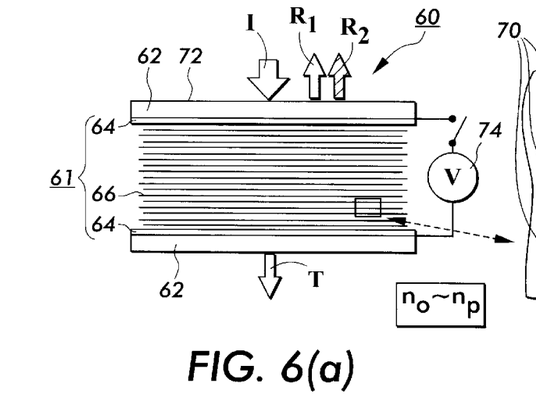
FIG. 6(a) illustrates a second exemplary embodiment of a holographic polymer dispersed cholesteric texture liquid crystal reflective display according to this invention in the field-off state, in which the liquid crystal droplets have a planar texture.
Figure 6B:
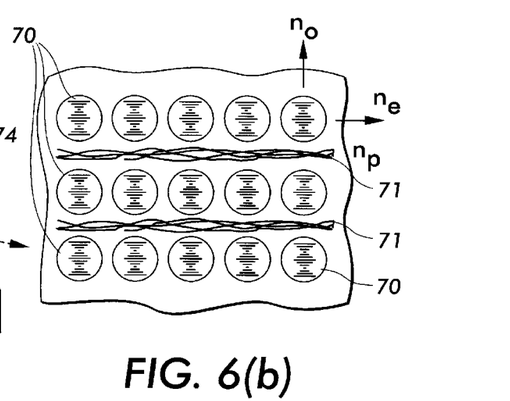
FIG. 6(b) is an enlarged view of a portion of the holographic polymer dispersed cholesteric texture liquid crystal material of the display of FIG. 6(a), showing the orientation of the liquid crystal droplets in the field-off state.

FIGS. 6(a) and 6(b) show the holographic polymer dispersed cholesteric liquid crystal display 60 in the off-state, in which no voltage is applied to the electrodes 64. In the off-state, the cholesteric liquid crystal material in the cholesteric liquid crystal layers 70 is in the planar state in which the helical axes are substantially perpendicular to the incident light surface 72. In this alignment, the extraordinary index of refraction $n_e$ extends in the direction parallel to the surface 72, and the ordinary index of refraction $n_0$ extends perpendicular to the surface 72. In the off-state, the incident light I that impinges on the surface 72 is partially reflected and also partially transmitted through the display, as represented by the arrow T. The arrows $R_1$ and $R_2$ represent light of two different Bragg wavelengths $\lambda_{BH}$ and $\lambda_{BC}$ and one or more associated intrinsic colors reflected by the holographic structure and the cholesteric liquid crystal layers 70, respectively. For example, $R_1$ could represent yellow light and $R_2$ could represent blue light.

Figure 6C:
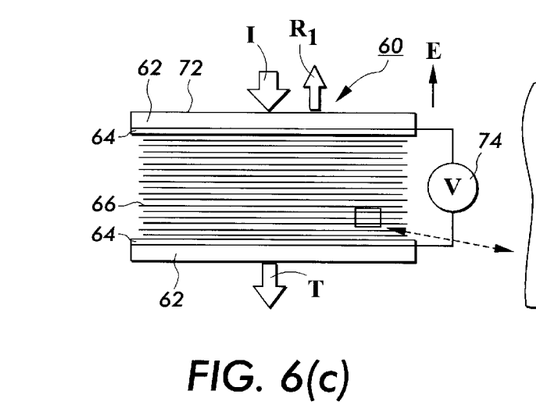
FIG. 6(c) illustrates the holographic polymer dispersed cholesteric texture liquid crystal reflective display of FIG. 6(a) in an intermediate applied voltage state, in which the liquid crystal droplets have a focal conic texture.
Figure 6D:
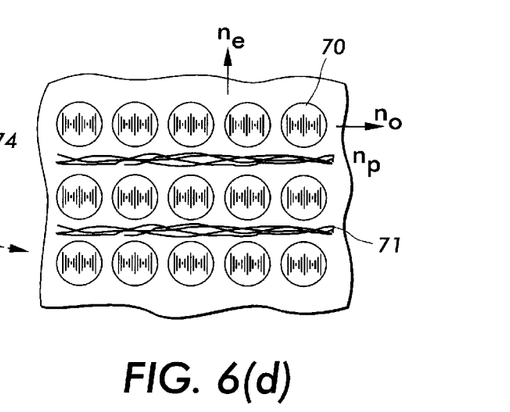
FIG. 6(d) is an enlarged view of a portion of the holographic polymer dispersed cholesteric texture liquid crystal material of the display of FIG. 6(c), showing the orientation of the liquid crystal droplets in the intermediate applied voltage state.

FIGS. 6(c) and 6(d) show the holographic polymer dispersed cholesteric liquid crystal display 60 when an intermediate level of voltage is applied across the electrodes 64 by the voltage source 74. As shown in FIG. 6(d), the cholesteric liquid crystal material in the cholesteric liquid crystal layers 70 is transformed into a focal conic texture, in which the helical axes of the cholesteric liquid crystal are partially aligned substantially perpendicular to the applied field E. As shown, both the ordinary index of refraction $n_o$ and the extraordinary index of refraction $n_e$ of the cholesteric liquid crystal layers are on average aligned at intermediate angles between the substrates and the direction of the applied E field. In this state, the holographic structure reflects light $R_1$ of the associated Bragg wavelength $\lambda_{BH}$ and the cholesteric liquid crystal layers 70 transmit substantially all light at the associated Bragg wavelength $\lambda_{BC}$. The holographic polymer dispersed cholesteric liquid crystal display 60 may exhibit some level of haziness in this state.

Figure 6E:
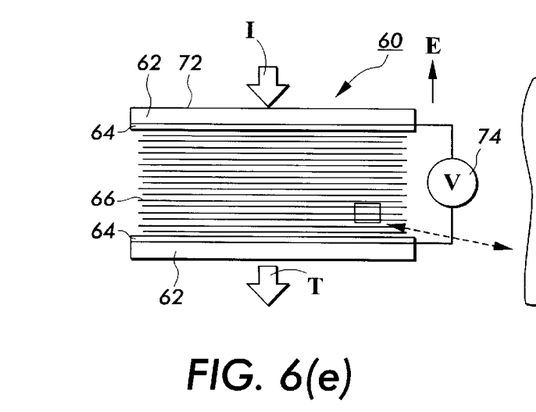
FIG. 6(e) illustrates the holographic polymer dispersed cholesteric texture liquid crystal reflective display of FIG. 6(a) in a high applied voltage state, in which the liquid crystal droplets have a homeotropic texture.
Figure 6F:
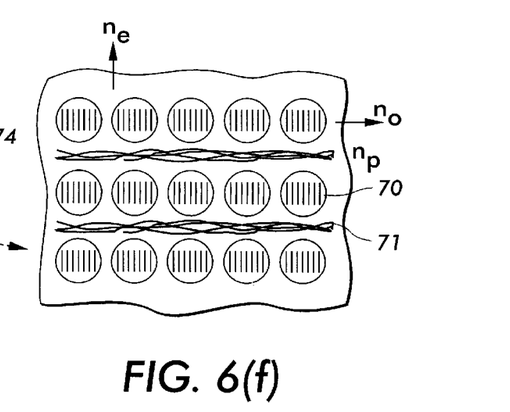
FIG. 6(f) is an enlarged view of a portion of the holographic polymer dispersed cholesteric texture liquid crystal material of the display of FIG. 6(e), showing the orientation of the liquid crystal droplets in the high applied voltage state.

FIGS. 6(e) and 6(f) show the holographic polymer dispersed cholesteric liquid crystal display 60 when a voltage higher than the intermediate voltage is applied across the electrodes 64 by the voltage source 74. As shown in FIG. 6(f), the cholesteric liquid crystal material in the cholesteric liquid crystal layers 70 is transformed into the homeotropic state, in which the helical axes of the liquid cholesteric crystal are substantially aligned and substantially perpendicular to the direction of the applied E field. The molecule directors of the cholesteric liquid crystal have about the same length and the molecules are substantially untwisted. The ordinary index of refraction $n_o$ of the cholesteric liquid crystal is substantially perpendicular to the direction of the applied E field. In this state, the cell is substantially transparent to the incident light.

The behavior of the cholesteric liquid crystal material in the cholesteric liquid crystal layers 70 in the holographic polymer dispersed cholesteric liquid crystal display 60 to the release of the high applied voltage to a lower voltage is the same as the behavior described above for the holographic polymer dispersed cholesteric liquid crystal display 40. That is the homeotropic texture shown in FIG. 6(f) relaxes to one of the focal conic texture shown in FIG. 6(d), or the planar texture shown in FIG. 6(b), depending on the rate of decrease of the voltage. If the voltage is quickly released, then the homeotropic texture relaxes to the planar texture of FIG. 6(b), and cells 61 of the holographic polymer dispersed cholesteric liquid crystal display 60 reflect light of both intrinsic peak wavelengths $R_1$ and $R_2$. If the voltage is more slowly released, the homeotropic texture relaxes to the focal conic texture of FIG. 6(d), and the cells 61 of the holographic polymer dispersed cholesteric liquid crystal display 60 reflect light $R_1$ of the intrinsic peak wavelength corresponding to the holographic structure.

Figure 7:
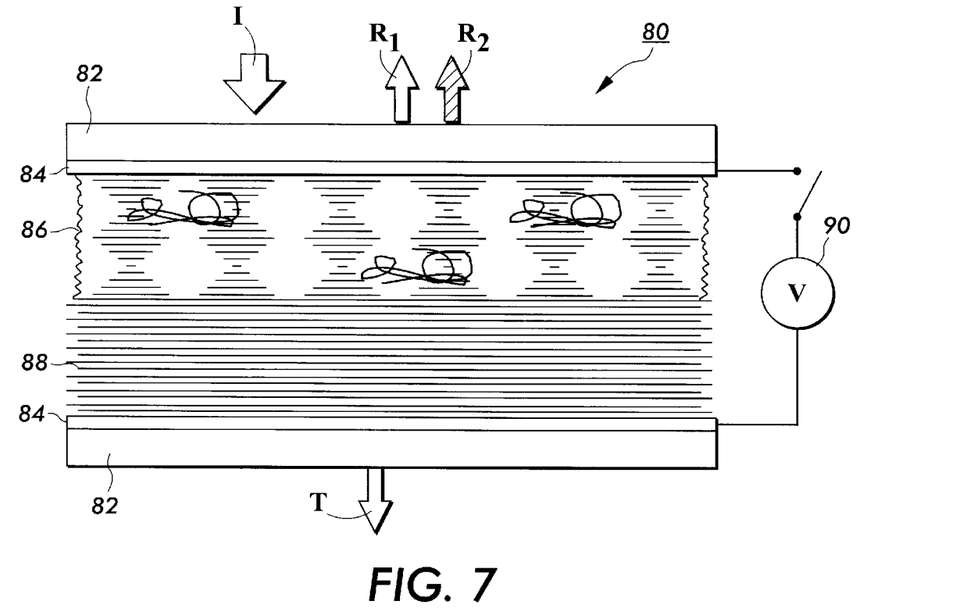
FIG. 7 illustrates a third exemplary embodiment of a holographic polymer dispersed cholesteric texture liquid crystal reflective display according to this invention in the field-off state.

FIG. 7 shows a third exemplary embodiment of a holographic polymer dispersed cholesteric liquid crystal display 80 according to this invention. The holographic polymer dispersed cholesteric liquid crystal display 80 comprises a pair of substrates 82; a pair of electrodes 84; and a light reflective medium which comprises a cholesteric liquid crystal layer 86 that is formed separately from a holographically structured polymer dispersed liquid crystal layer 88. The illustrated cell is shown in the off-state, in which the cholesteric liquid crystal layer 86 is in the planar texture and first and second intrinsic peak wavelengths (of one or more intrinsic colors) are reflected by the different layers, as depicted by the arrows $R_1$ and $R_2$. The holographic polymer dispersed cholesteric liquid crystal display 80 comprises a single voltage source 90 that selectively applies voltage to the cholesteric liquid crystal layer 86 and the holographically structured polymer dispersed liquid crystal layer 88.

Figure 8:
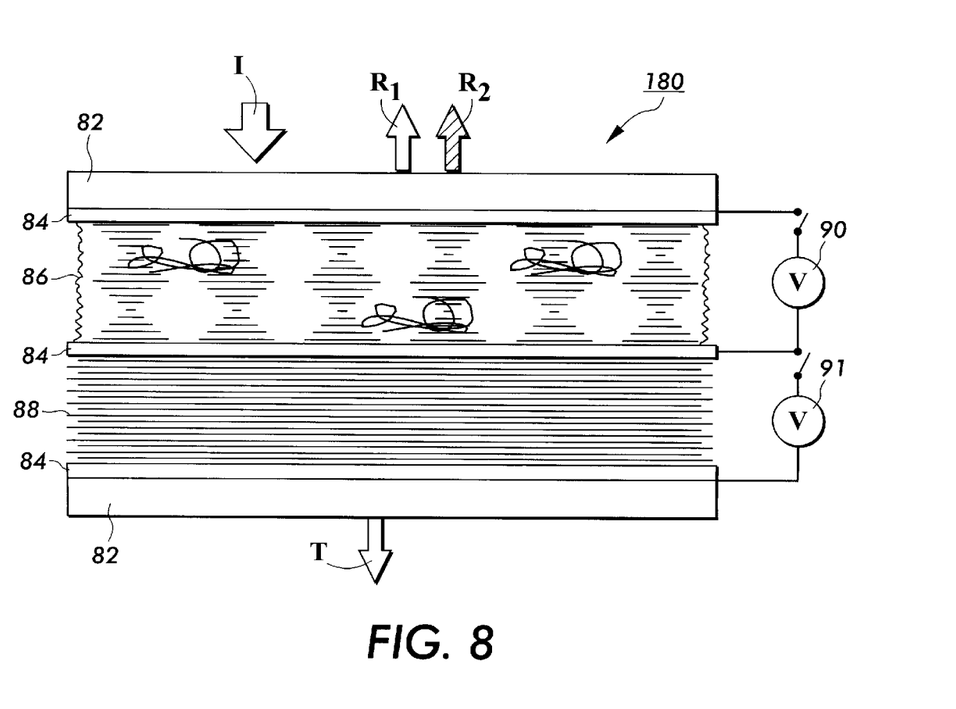
FIG. 8 illustrates a fourth exemplary embodiment of a holographic polymer dispersed cholesteric texture liquid crystal reflective display according to this invention in the field-off state.

FIG. 8 shows a fourth exemplary embodiment of holographic polymer dispersed cholesteric liquid crystal display 180 according to this invention. In FIG. 8, the light reflective medium comprises a cholesteric liquid crystal layer 86 separated from a holographically structured polymer dispersed liquid crystal layer 88 by an electrode 84, and two voltage sources 90 and 91. The voltage sources 90 and 91 selectively apply voltage to the cholesteric liquid crystal layer 86 and the holographically structured polymer dispersed liquid crystal layer 88, respectively, to cause these layers to selectively reflect or transmit light at the associated Bragg wavelengths $\lambda_{BC}$ and $\lambda_{BH}$.

Figure 9:
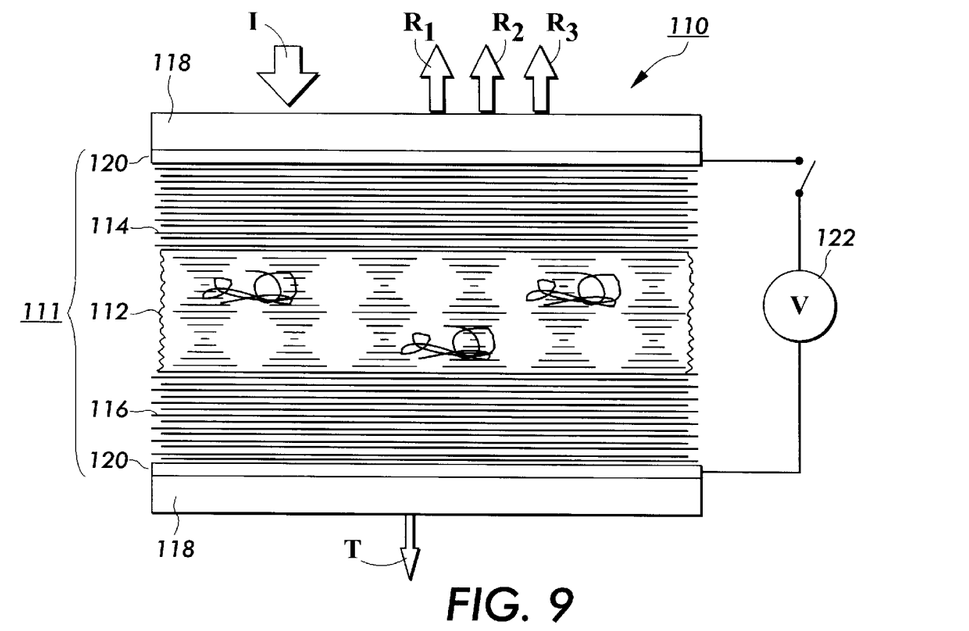
FIG. 9 illustrates a fifth exemplary embodiment of a holographic polymer dispersed cholesteric texture liquid crystal reflective display according to this invention in the field-off state.
Figure 10:
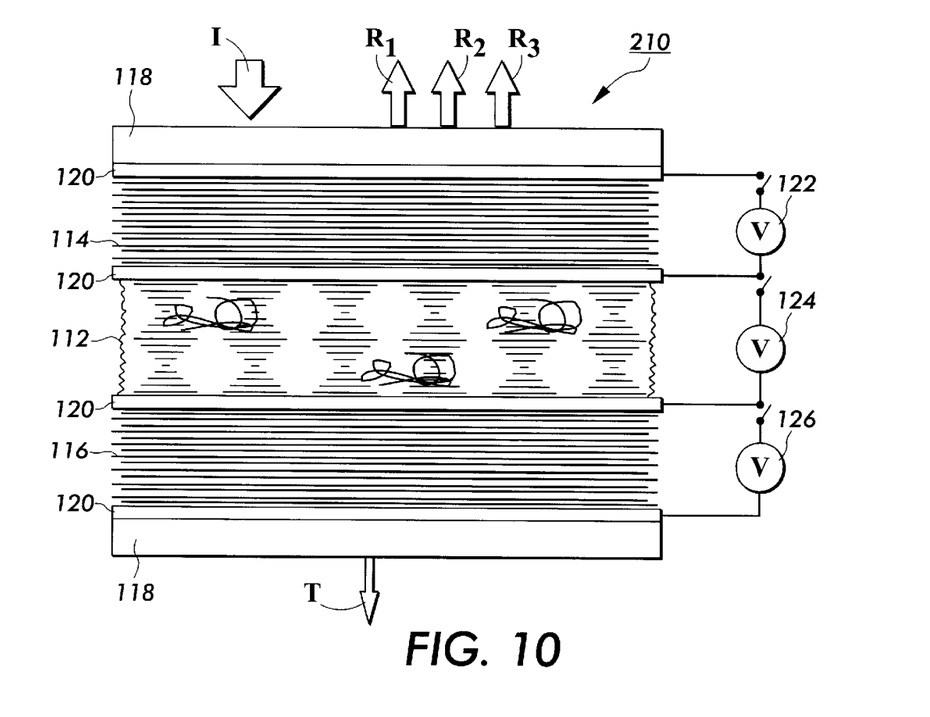
FIG. 10 illustrates a sixth exemplary embodiment of a holographic polymer dispersed cholesteric texture liquid crystal reflective display according to this invention in the field-off state.

FIGS. 9 and 10 show, respectively, fifth and sixth exemplary embodiments of a holographic polymer dispersed cholesteric liquid crystal display according to this invention. As shown in FIGS. 9 and 10, multi-color displays can include a light reflective medium that has more than one of the cholesteric liquid crystal layers and/or more than one of the holographically structured polymer dispersed liquid crystal layers. Each layer of these light reflective structures will reflect light of a different intrinsic peak wavelength. It will be appreciated that the different intrinsic peak wavelengths can each be for a different intrinsic color.

In particular, FIG. 9 shows the fifth exemplary embodiment of a holographic polymer dispersed cholesteric liquid crystal display 110, which comprises cells 111 that include a light reflective medium including three separate layers. The holographic polymer dispersed cholesteric liquid crystal display 110 includes a cholesteric liquid crystal layer 112 formed between a first holographically structured polymer dispersed liquid crystal layer 114 and a second holographically structured polymer dispersed liquid crystal layer 116. The layers 112, 114 and 116 are disposed between a pair of substrates 118 and a pair of electrodes 120, and are totally separated from each other.

In FIG. 9, the illustrated cell is shown in the off-state, in which the cholesteric liquid crystal layer 112 is in the planar texture. In the off-state, the first holographically structured polymer dispersed liquid crystal layer 114 reflects a first intrinsic peak wavelength $R_1$, the cholesteric liquid crystal layer 112 reflects a second intrinsic peak wavelength $R_2$, and the second holographically structured polymer dispersed liquid crystal layer 116 reflects a third intrinsic peak wavelength $R_3$. For example, the first holographically structured polymer dispersed liquid crystal layer 114 can reflect blue light, the cholesteric liquid crystal layer 112 can reflect green light and the second holographically structured polymer dispersed liquid crystal layer 116 can reflect red light. Thus, the cells 111 of the holographic polymer dispersed cholesteric liquid crystal display 110 can emit all colors by selectively mixing the three reflected intrinsic colors $R_1$, $R_2$ and $R_3$. It will be appreciated that the three intrinsic peak wavelengths can optionally be for less than three intrinsic colors (i.e., one or two intrinsic colors).

When an intermediate voltage is applied to the cells by a single voltage source 122, the first holographically structured polymer dispersed liquid crystal layer 114 reflects the first intrinsic peak wavelength or intrinsic color $R_1$, the second holographically structured polymer dispersed liquid crystal layer 116 reflects the third color $R_3$, and the cholesteric liquid crystal layer 112 transmits all wavelengths of the incident light I.

FIG. 10 shows the sixth exemplary embodiment of the holographic polymer dispersed cholesteric liquid crystal display 210 according to this invention. The holographic polymer dispersed cholesteric liquid crystal display 210 comprises three separate voltage sources 122, 124, 126. One voltage source 122 is associated with the first holographically structured polymer dispersed liquid crystal layer 114, the second voltage source 124 is associated with the cholesteric liquid crystal layer 112, and the third voltage source 126 is associated with the second holographically structured polymer dispersed liquid crystal layer 116. The holographic polymer dispersed cholesteric liquid crystal display 210 comprises four electrodes 120. The first holographically structured polymer dispersed liquid crystal layer 114, the cholesteric liquid crystal layer 112 and the second holographically structured polymer dispersed liquid crystal layer 116 are each between a pair of the electrodes 120. The voltage sources 122, 124 and 126 can selectively apply voltages of selected values to the first holographically structured polymer dispersed liquid crystal layer 114, the cholesteric liquid crystal layer 112 and the second holographically structured polymer dispersed liquid crystal layer 116 to enable the holographic polymer dispersed cholesteric liquid crystal display 210 to selectively reflect one, two or three, intrinsic peak wavelengths in all possible combinations. The different intrinsic peak wavelengths can be for different intrinsic colors.

Alternatively, the holographic polymer dispersed cholesteric liquid crystal displays 110 and 210 can comprise more than one cholesteric liquid crystal layer 112. For example, the holographic polymer dispersed cholesteric liquid crystal displays 110 and 210 can comprise two cholesteric liquid crystal layers 112, and a single holographically structured polymer dispersed liquid crystal layer.

Thus, this invention provides reflective holographic polymer dispersed cholesteric liquid crystal displays that utilize the intrinsic reflectivity of both cholesteric liquid crystals and holographically structured polymer dispersed liquid crystal structures. The results offer important advantages. First, the holographic polymer dispersed cholesteric liquid crystal displays can provide a higher reflectance than cholesteric or holographically structured polymer dispersed liquid crystal displays can offer alone. The holographic polymer dispersed cholesteric liquid crystal displays according to this invention also can also exhibit the memory effect, which is not possible with conventional holographically structured polymer dispersed liquid crystal displays. As explained, this memory effect can reduce power consumption significantly, because power typically needs to be applied only briefly to change the viewing display. In addition, the holographic polymer dispersed cholesteric liquid crystal displays according to this invention can reflect two or more intrinsic peak wavelengths (and one or more intrinsic colors) from single cells. Furthermore, the holographic polymer dispersed cholesteric liquid crystal displays according to this invention can provide a higher reflectance than holographically structured polymer dispersed liquid crystal displays due to having a larger effective difference $n_e - n_o$ than holographically structured polymer dispersed liquid crystals with randomly oriented droplets can achieve.

Another advantage of this invention is that the reflection direction of the holographic polymer dispersed cholesteric liquid crystal layers can be made away from the surface glare of the display devices. This can be achieved by setting the two interfering laser beams at appropriate angles so that the interfering fringe layers tilt away from the display surfaces. This feature will allow the holographic polymer dispersed cholesteric liquid crystal displays not only to avoid glare images that many reflective displays have a difficult time avoiding, but also to maintain the color saturation that many reflective displays have a difficult time maintaining by avoiding the broadband surface reflections.

While this invention has been described in conjunction with the specific embodiments described above, it is evident that many alternatives, modifications and variations are apparent to those skilled in the art in view of this disclosure. Accordingly, the preferred embodiments of this invention as set forth above are intended to be illustrative and not limiting. Various changes can be made without departing from the spirit and scope of this invention.

What is claimed is:

1. A reflective display, comprising:
    a first substrate;
    a second substrate; and
    a light reflective medium formed between the first and second substrates, the light reflective medium reflects light at two or more intrinsic peak wavelengths, wherein the light reflective medium comprising a holographic polymer dispersed cholesteric liquid crystal material formed between the first and second substrates, the holographic polymer dispersed cholesteric liquid crystal material including:
    polymer layers; and
    cholesteric liquid crystal layers comprising a cholesteric liquid crystal material; and
    the holographic polymer dispersed cholesteric liquid crystal material reflects light at a first intrinsic peak wavelength and at a second intrinsic peak wavelength.

2. The reflective display of claim 1, further comprising a voltage source that selectively applies a voltage to the first and second substrates, wherein:
    when the voltage is zero, the cholesteric liquid crystal material has a substantially planar texture and the display reflects light at the first and second intrinsic peak wavelengths;
    when the voltage has a first value, the cholesteric liquid crystal material has a substantially focal conic texture and the display reflects light at the first intrinsic peak wavelength and transmits light at the second intrinsic peak wavelength; and
    when the voltage has a second value greater than the first value, the cholesteric liquid crystal material has a substantially homeotropic texture and the display transmits light at the first and second intrinsic peak wavelengths.

3. The reflective display of claim 2, wherein:
    the voltage applied to the first and second substrates is released from the second value to a lower value at a first rate or at a second rate;
    when the voltage is released at the first rate, the texture of the cholesteric liquid crystal material transforms from the homeotropic texture to the focal conic texture, and
    when the voltage is released at the second rate, the texture of the cholesteric liquid crystal material transforms from the homeotropic texture to the planar texture.

4. A method of making a reflective display, comprising:
    a) providing a first substrate;
    b) providing a second substrate; and
    c) forming a light reflective medium between the first and second substrates, the light reflective medium, the light reflective medium reflects light of at least two intrinsic peak wavelengths, the light reflective medium comprising a holographic polymer dispersed cholesteric liquid crystal material formed between the first and second substrates, the holographic polymer dispersed cholesteric liquid crystal material includes polymer layers, and cholesteric liquid crystal layers comprising a cholesteric liquid crystal material,
    wherein the holographic polymer dispersed cholesteric liquid crystal material reflects light of a first intrinsic peak wavelength and a second intrinsic peak wavelength.

5. The method of claim 4, wherein the light reflective medium comprises alternating layers that comprise the cholesteric liquid crystal and the polymer.

6. A method of making a reflective display, comprising:
    a) providing a first substrate;
    b) providing a second substrate; and c) forming a light reflective medium between the first and second substrates, the light reflective medium comprising alternating layers that include a cholesteric liquid crystal material and a polymer material, wherein the alternating layers of the light reflective medium are oriented to reflect light of two or more intrinsic peak wavelengths in a reflection direction that is away from surface glare from the first or second substrate.

7. The method of claim 6, wherein the light reflective medium comprises separate layers including at least one layer comprising the cholesteric liquid crystal material, and at least one layer comprising the polymer material.

8. A method of making a reflective display, comprising:
   a) providing a first substrate;
   b) providing a second substrate;
   c) forming a light reflective medium that reflects light at two or more intrinsic peak wavelengths between the first and second substrates, the light reflective medium comprising (i) a first layer comprising a first holographic polymer dispersed liquid crystal material and (ii) a second layer separate from the first layer, the second layer comprising a first cholesteric liquid crystal material,
      wherein the first layer reflects light at a first intrinsic peak wavelength and the second layer reflects light at a second intrinsic peak wavelength, and
      wherein the texture of the first cholesteric liquid crystal material can be changed to reflect or transmit light at the second intrinsic peak wavelength by applying voltage to the first and second substrates.

9. The method of claim 8, further comprising:
   d) forming a third layer between the first and second substrates, the third layer being separate from the first and second layers and comprising one of (i) a second holographic polymer dispersed liquid crystal material that reflects light at a third intrinsic peak wavelength, and (ii) a second cholesteric liquid crystal material that reflects light at the third intrinsic peak wavelength.

10. The method of claim 9, wherein the third layer comprises the second holographic polymer dispersed liquid crystal material.

11. The method of claim 9, wherein the third layer comprises the second cholesteric liquid crystal material.

12. A reflective display, comprising:
   a first substrate;
   a second substrate; and
   a light reflective medium formed between the first and second substrates, the light reflective medium comprising alternating layers that include a cholesteric liquid crystal material and a polymer material,
      wherein the alternating layers of the light reflective medium are oriented to reflect light at two or more intrinsic peak wavelengths in a reflection direction that is away from surface glare from the first or second substrate.

13. A reflective display, comprising:
   a first substrate;
   a second substrate;
   a light reflective medium that reflects light at two or more intrinsic peak wavelengths formed between the first and second substrates, the light reflective medium including:
      a first layer formed between the first and second substrates, the first layer comprising a first holographic polymer dispersed liquid crystal material; and
      a second layer formed between the first and second substrates and separate from the first layer, the second layer comprising a first cholesteric liquid crystal material,
         wherein the first layer reflects light at a first intrinsic peak wavelength and the second layer reflects light at a second intrinsic peak wavelength, and
         wherein the texture of the first cholesteric liquid crystal material can be changed to reflect or transmit light at the second intrinsic peak wavelength by applying voltage to the first and second substrates.

14. The reflective display of claim 13, further comprising a voltage source that selectively applies a voltage to the first and second substrates, wherein:
   when the voltage is zero, the first cholesteric liquid crystal material has a substantially planar texture and the display reflects light at the first and second intrinsic peak wavelengths;
   when the voltage has a first value, the first cholesteric liquid crystal material has a substantially focal conic texture and the display reflects light at the first intrinsic peak wavelength and transmits light at the second intrinsic peak wavelength; and
   when the voltage has a second value higher than the first value, the first cholesteric liquid crystal material has a substantially homeotropic texture and the display transmits light at the first and second intrinsic peak wavelengths.

15. The reflective display of claim 14, wherein the voltage applied to the first and second substrates can be released from the second value to a lower value at a first rate or at a second rate;
   when the voltage is released at the first rate, the texture of the first cholesteric liquid crystal material transforms from the homeotropic texture to the focal conic texture, and
   when the voltage is released at the second rate, the texture of the first cholesteric liquid crystal material transforms from the homeotropic texture to the planar texture.

16. The reflective display of claim 13, further comprising a third layer formed between the first and second substrates, the third layer being separate from the first and second layers and comprising one of (i) a second holographic polymer dispersed liquid crystal material, and (ii) a second cholesteric liquid crystal material, wherein the third layer reflects light at a third intrinsic peak wavelength.

17. The reflective display of claim 10, wherein the third layer comprises the second holographic polymer dispersed liquid crystal material, and the display further comprises a voltage source that selectively applies a voltage to the first and second substrates, wherein:
   when the voltage is zero, the first cholesteric liquid crystal material has a substantially planar texture and the display reflects light at the first, second and third intrinsic peak wavelengths;
   when the voltage has a first value, the first cholesteric liquid crystal material has a substantially focal conic texture and the display reflects light at the first and third intrinsic peak wavelengths and transmits light at the second intrinsic peak wavelength; and
   when the voltage has a second value higher than the first value, the first cholesteric liquid crystal material has a substantially homeotropic texture and the display transmits light at the first, second and third intrinsic peak wavelengths.

18. The reflective display of claim 17, wherein the voltage applied to the first and second substrates can be released from the second value to a lower value at a first rate or at a second rate;

when the voltage is released at the first rate, the texture of the first cholesteric liquid crystal material transforms from the homeotropic texture to the focal conic texture; and when the voltage is released at the second rate, the texture of the first cholesteric liquid crystal material transforms from the homeotropic texture to the planar texture.

19. The reflective display of claim 16, wherein the third layer comprises the second holographic polymer dispersed liquid crystal material and the display further comprises:

f) a third substrate separating the first and second layers;

g) a fourth substrate separating the second and third layers;

h) a first voltage source that selectively applies a first voltage to the first and third substrates.

i) a second voltage source that selectively applies a second voltage to the third and fourth substrates; and j) a third voltage source that selectively applies a third voltage to the second and fourth substrates, wherein:

when the first, second and third voltages are zero, the first cholesteric liquid crystal material has a substantially planar texture and the display reflects light at the first, second and third intrinsic peak wavelengths;

when the first, second and third voltages have a first value, the first cholesteric liquid crystal material has a substantially focal conic texture and the display reflects light at the first and third intrinsic peak wavelengths and transmits light at the second intrinsic peak wavelength; and when the first, second and third voltages have a second value higher than the first value, the first cholesteric liquid crystal material has a substantially homeotropic texture and the display transmits the first, second and third intrinsic peak wavelengths.

20. The reflective display of claim 19, wherein the second voltage can be released from the second value to a lower value at a first rate or at a second rate;

when the second voltage is released at the first rate, the texture of the first cholesteric liquid crystal material transforms from the homeotropic texture to the focal conic texture, and when the second voltage is released at the second rate, the texture of the first cholesteric liquid crystal material transforms from the homeotropic texture to the planar texture.

21. The reflective display of claim 19, wherein the values of the first, second and third voltages applied at a given time to the first, second and third layers, respectively, can be the same or different from each other.

22. The reflective display of claim 16, wherein the third layer comprises the second cholesteric liquid crystal material.

23. The reflective display of claim 16, wherein the third layer comprises the second cholesteric liquid crystal material, and the display further comprises a voltage source that selectively applies a voltage to the first and second substrates, wherein:

when the voltage is zero, the first and second cholesteric liquid crystal materials have a substantially planar texture and the display reflects the first, second and third intrinsic peak wavelengths;

when the voltage has a first value, the first and second cholesteric liquid crystal materials have a substantially focal conic texture and the display reflects light at the first intrinsic and transmits light at the second and third intrinsic peak wavelengths; and when the voltage has a second value higher than the first value, the first and second cholesteric liquid crystal materials have a substantially homeotropic texture and the display transmits light at the first, second and third intrinsic peak wavelengths.

24. The reflective display of claim 23, wherein the voltage applied to the first and second substrates can be released from the second value to a lower value at a first rate or at a second rate;

when the voltage is released at the first rate, the texture of the first and second cholesteric liquid crystal materials transforms from the homeotropic texture to the focal conic texture, and when the voltage is released at the second rate, the texture of the first and second cholesteric liquid crystal materials transforms from the homeotropic texture to the planar texture.

25. The reflective display of claim 16, wherein the third layer comprises the second cholesteric liquid crystal material, and the display further comprises:

f) a third substrate separating the first and second layers;

g) a fourth substrate separating the second and third layers;

h) a first voltage source that selectively applies a first voltage to the first and third substrates;

i) a second voltage source that selectively applies a second voltage to the third and fourth substrates; and j) a third voltage source that selectively applies a third voltage to the second and fourth substrates.

wherein:

when the first, second and third voltages are zero, the first and second cholesteric liquid crystal materials have a substantially planar texture and the display reflects light at the first, second and third intrinsic peak wavelengths;

when the first, second and third voltages have a first value, the first and second cholesteric liquid crystal materials have a substantially focal conic texture and the display reflects light at the first intrinsic peak wavelength and transmits light at the second and third intrinsic peak wavelengths; and when the first, second and third voltages have a second value higher than the first value, the first and second cholesteric liquid crystal materials have a substantially homeotropic texture and the display transmits light at the first, second and third intrinsic peak wavelengths.

26. The reflective display of claim 25, wherein the values of the first, second and third voltages applied at a given time to the first, second and third layers, respectively, can be the same or different from each other.

* * * * *